(12) United States Patent
Tanaka et al.

(10) Patent No.: US 11,473,698 B2
(45) Date of Patent: Oct. 18, 2022

(54) SPOOL VALVE DEVICE AND SPOOL VALVE

(71) Applicant: KAWASAKI JUKOGYO KABUSHIKI KAISHA, Kobe (JP)

(72) Inventors: Hideki Tanaka, Nishinomiya (JP); Yukito Imamura, Kobe (JP); Kenjirou Hara, Kobe (JP); Masahiro Yamada, Kobe (JP); Keita Morikawa, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 342 days.

(21) Appl. No.: 16/646,627

(22) PCT Filed: Sep. 11, 2018

(86) PCT No.: PCT/JP2018/033556
§ 371 (c)(1),
(2) Date: Mar. 12, 2020

(87) PCT Pub. No.: WO2019/054352
PCT Pub. Date: Mar. 21, 2019

(65) Prior Publication Data
US 2020/0292100 A1    Sep. 17, 2020

(30) Foreign Application Priority Data

Sep. 12, 2017 (JP) .............................. JP2017-174671

(51) Int. Cl.
*F16K 37/00* (2006.01)
*F16K 11/07* (2006.01)
(Continued)

(52) U.S. Cl.
CPC ........ *F16K 37/0041* (2013.01); *F15B 19/005* (2013.01); *F15B 20/002* (2013.01);
(Continued)

(58) Field of Classification Search
CPC .. F16K 37/0041; F16K 37/0025; F16K 31/04; F16K 31/046; F16K 31/047;
(Continued)

(56) References Cited

U.S. PATENT DOCUMENTS 8,939,173 B2 * 1/2015 Yahr ..................... F16K 11/065
251/266
2005/0000580 A1 * 1/2005 Tranovich ........... F16K 37/0041
137/625.65
(Continued)

FOREIGN PATENT DOCUMENTS

CN    103101571 A    5/2013
EP    0 131 656 A1    1/1985
(Continued)

OTHER PUBLICATIONS

Murrenhoff H: "Trends in Der Ventilentwicklung", O & P—Oelhydraulik und Pneumatik: Zeitschrift Fuerfluidtechnik, Aktorik, Steuerelektronik und Sensorik, Vereinigte Fachverlage Gmbh, DE, vol. 47, No. 4, Apr. 1, 2003 (Apr. 1, 2003), pp. 226-241, 230.

*Primary Examiner* — Patrick C Williams
(74) *Attorney, Agent, or Firm* — Oliff PLC

(57) ABSTRACT

A spool valve device includes: a housing with channels; a spool moving to change channel connection statuses; an electric actuator including an electric motor and linear-motion conversion mechanism, the motor rotating an output shaft by torque corresponding to a drive current supplied to the motor, the mechanism converting rotational output shaft movement into straight movement and applying thrust corresponding to the torque to the spool to change position; a biasing member applying biasing force to the spool against the actuator thrust; an angle detector detecting an motor output shaft angular position; a driving portion driving the motor by controlling drive current flow supplied to the motor based on a position command input and the angular (Continued)

position detected by the angle detector; and an abnormality determining portion calculating the spool position based on the detected angular position and determine presence or absence of operation spool abnormality.

5 Claims, 6 Drawing Sheets

(51) Int. Cl.
| | |
|---|---|
| *F16K 31/04* | (2006.01) |
| *F16K 3/24* | (2006.01) |
| *F15B 20/00* | (2006.01) |
| *F15B 19/00* | (2006.01) |
| *F15B 13/04* | (2006.01) |
| *F15B 13/044* | (2006.01) |

(52) U.S. Cl.
CPC ............ *F16K 3/24* (2013.01); *F16K 11/0708* (2013.01); *F16K 31/04* (2013.01); *F16K 31/046* (2013.01); *F16K 31/047* (2013.01); *F15B 13/0444* (2013.01); *F15B 2013/0409* (2013.01); *F15B 2013/0412* (2013.01); *F15B 2013/0413* (2013.01); *F15B 2211/327* (2013.01); *F15B 2211/634* (2013.01); *F15B 2211/6336* (2013.01); *F15B 2211/6656* (2013.01); *F15B 2211/8636* (2013.01); *F15B 2211/87* (2013.01); *F15B 2211/8752* (2013.01); *F16K 37/0025* (2013.01)

(58) Field of Classification Search
CPC ...... F16K 3/24; F16K 11/0708; F15B 19/005; F15B 20/002; F15B 13/0444; F15B 2013/0404; F15B 2013/0412; F15B 2013/0413; F15B 2211/327; F15B 2211/6336; F15B 2211/634; F15B 2211/6656; F15B 2211/8636; F15B 2211/87; F15B 2211/8752
See application file for complete search history.

(56) References Cited

U.S. PATENT DOCUMENTS

| | | | |
|---|---|---|---|
| 2013/0118826 A1 | 5/2013 | Izutani et al. | |
| 2016/0290516 A1* | 10/2016 | Beschorner | ......... F15B 13/0405 |
| 2017/0211699 A1* | 7/2017 | Sasanuma | ............ F15B 13/0402 |

FOREIGN PATENT DOCUMENTS

| | | |
|---|---|---|
| JP | H05-39885 A | 2/1993 |
| JP | 2014-173711 A | 9/2014 |
| JP | 5666174 B2 | 2/2015 |
| KR | 10-2011-0135816 A | 12/2011 |
| KR | 101877051 B1 | 7/2018 |
| WO | 2009/151955 A1 | 12/2009 |

* cited by examiner

SPOOL VALVE DEVICE AND SPOOL VALVE

TECHNICAL FIELD

The present invention relates to a spool valve device configured to move a spool by an electric actuator, and a spool valve.

BACKGROUND ART

A spool valve is known as one example of a control valve. The spool valve can control a flow direction and flow rate of an operating liquid in accordance with the position of a spool. Known examples of the spool valve include: a pilot drive spool valve configured to apply pilot pressure to a spool to change the position of the spool; and an actuator drive spool valve configured to change the position of a spool by a linear-motion actuator. For example, a multiple direction switching valve of PTL 1 is known as the actuator drive spool valve. In the multiple direction switching valve of PTL 1, an output shaft of an electric motor is coupled to a spool through a ball screw reduction gear. Therefore, when the output shaft of the electric motor is rotated, the spool moves in an axial direction thereof, and thus, the position of the spool changes.

CITATION LIST

Patent Literature

PTL 1: Japanese Patent No. 5666174

SUMMARY OF INVENTION

Technical Problem

In the multiple direction switching valve of PTL 1, the position of the spool is changed by applying thrust of the electric motor to the spool. Further, biasing force of a spring acts on the spool against the thrust of the electric motor, and the biasing force changes in accordance with the position of the spool. Therefore, the position of the spool can be changed by changing the thrust applied to the spool. By recognizing the position of the spool where the thrust and the biasing force are balanced, the position of the spool can be determined by a current supplied to the electric motor. According to the multiple direction switching valve configured as above, when a malfunction occurs, such as when the spool does not move due to sticking, such malfunction cannot be detected.

It should be noted that according to the multiple direction switching valve, the following example is described as another method of determining the position of the spool. To be specific, PTL 1 describes that: a servomotor is used as the electric motor; a position sensor is provided at the spool; and the position of the spool is controlled based on a signal output from the position sensor. By providing the position sensor configured to detect the position of the spool, operation abnormality, such as the sticking of the spool, can be determined. However, by providing such sensor, the number of parts of the spool valve device that is the multiple direction switching valve increases.

An object of the present invention is to provide a spool valve device capable of detecting operation abnormality of a spool without increasing the number of parts.

Solution to Problem

A spool valve device of the present invention includes: a housing on which a plurality of channels are formed; a spool inserted into the housing so as to be movable, the spool being configured to move and change a position of the spool to change connection statuses of the plurality of channels; an electric actuator including an electric motor and a linear-motion conversion mechanism, the electric motor being configured to rotate an output shaft by torque corresponding to a drive current supplied to the electric motor, the linear-motion conversion mechanism being configured to convert rotational movement of the output shaft into straight movement and apply thrust corresponding to the torque to the spool to change the position of the spool; a biasing member configured to apply biasing force to the spool against the thrust of the electric actuator; an angle detector configured to detect an angular position of the output shaft of the electric motor; a driving portion configured to drive the electric motor by controlling flow of the drive current supplied to the electric motor based on a position command input to the driving portion and the angular position detected by the angle detector; and an abnormality determining portion configured to calculate the position of the spool based on the angular position detected by the angle detector and determine presence or absence of operation abnormality of the spool.

According to the present invention, since the electric actuator including the linear-motion conversion mechanism applies the thrust to the spool to move the spool, the angular position of the output shaft of the electric motor and the position of the spool correspond to each other. Therefore, the driving portion can calculate the position of the spool by using the angle detector provided at the electric motor to control the electric motor and determine the presence or absence of the operation abnormality of the spool. To be specific, the presence or absence of the operation abnormality can be determined without newly providing a position sensor configured to detect the position of the spool. Therefore, the presence or absence of the operation abnormality of the spool can be determined without increasing the number of parts of the spool valve device.

In the above invention, the abnormality determining portion may determine the presence or absence of the operation abnormality of the spool based on the drive current supplied from the driving portion to the electric motor in addition to the angular position detected by the angle detector.

According to the above configuration, since the presence or absence of the operation abnormality of the spool can be determined based on the angular position detected by the angle detector and the actual drive current actually input by the driving portion, the increase in the number of parts can be suppressed.

In the above invention, the abnormality determining portion may be configured to acquire first drive currents to be supplied to the electric motor to move the spool to respective positions. The abnormality determining portion may calculate the position of the spool based on the angular position detected by the angle detector and acquire the first drive current to be supplied to the electric motor to move the spool to the calculated position. The abnormality determining portion may determine the presence or absence of the operation abnormality of the spool based on a difference between the acquired first drive current and an actual drive current that is the drive current actually supplied from the driving portion to the electric motor.

According to the above configuration, the first drive currents to be input to the electric motor to move the spool to the respective positions are acquired in advance. With this, the presence or absence of the operation abnormality of the spool can be determined only by detecting the angular position of the output shaft and the actual drive current. Therefore, the presence or absence of the operation abnormality of the spool can be easily determined.

In the above invention, the abnormality determining portion may be configured to acquire second drive currents to be supplied to the electric motor to make the spool accelerate at respective arbitrary acceleration speeds. The abnormality determining portion may acquire the second drive current to be supplied to the electric motor to move the spool at the acceleration speed calculated based on the input position command. The abnormality determining portion may determine the presence or absence of the operation abnormality of the spool based on a difference between the actual drive current and a value obtained by adding the acquired second drive current to the acquired first drive current.

According to the above configuration, by adding the second drive current to the first drive current, the drive current to be input to the electric actuator to generate the thrust can be calculated more accurately. Therefore, the presence or absence of the operation abnormality of the spool can be determined more accurately.

In the above invention, the abnormality determining portion may calculate the position of the spool based on the angular position detected by the angle detector. The abnormality determining portion may calculate a deviation amount between the calculated position of the spool and the input position command. The abnormality determining portion may determine the presence or absence of the operation abnormality of the spool based on whether or not the calculated deviation amount is a predetermined threshold or less.

According to the above configuration, since the presence or absence of the operation abnormality of the spool can be determined based on the position command and the angular position detected by the angle detector, the increase in the number of parts can be suppressed.

In the above invention, the spool valve device may further include a drive amount detector configured to detect a drive amount of a hydraulic actuator, the hydraulic actuator being connected to at least one of the plurality of channels and operated by an operating liquid supplied through the at least one channel. The abnormality determining portion may determine the presence or absence of the operation abnormality of the spool based on the drive amount detected by the drive amount detector in addition to the angular position detected by the angle detector.

According to the above configuration, the operation abnormality of the spool valve is determined based on the drive amount of the hydraulic actuator. Whether or not the operation abnormality, such as abnormality in which the hydraulic actuator as a control target do not perform desired movement, has occurred at the spool can be determined.

In the above invention, the abnormality determining portion may be configured to acquire the angular positions of the output shaft of the electric motor with respect to the respective drive amounts of the hydraulic actuator. The abnormality determining portion may acquire, from a correspondence relation between the drive amounts and the angular positions, the drive amount of the hydraulic actuator based on the angular position detected by the angle detector. The abnormality determining portion may determine the presence or absence of the operation abnormality of the spool based on a difference between the acquired drive amount and an actual drive amount detected by the drive amount detector.

According to the above configuration, the correspondence relation between the drive amounts and the angular positions is acquired in advance. With this, the operation abnormality, such as the abnormality in which the hydraulic actuator as the control target do not perform the desired movement, can be detected.

In the above invention, the linear-motion conversion mechanism may include a pressing member configured to perform the straight movement and convert the rotational movement of the output shaft into the straight movement of the pressing member, and the pressing member may contact the spool and push the spool against the biasing member to move the spool.

According to the above configuration, since the spool and the pressing member just contact each other and are not coupled to each other, the spool and the pressing member can be separately assembled. Therefore, the spool valve device is easily assembled. Further, since the pressing member pushes the spool against the basing spring, the pressing member can be brought into contact with the spool at all times. Therefore, the spool can be moved to a desired position by adjusting the position of the pressing member. As above, the movement of the spool to the desired position can be achieved by the above-described simple configuration.

A spool valve of the present invention includes: a housing on which a plurality of channels are formed; a spool inserted into the housing so as to be movable, the spool being configured to move and change a position of the spool to change connection statuses of the plurality of channels; an electric actuator configured to move the spool; and a biasing member configured to apply biasing force to the spool against thrust of the electric actuator. The electric actuator includes an electric motor and a linear-motion conversion mechanism, the electric motor being configured to rotate an output shaft by torque corresponding to a drive current supplied to the electric motor, the linear-motion conversion mechanism including a linear-motion member configured to perform straight movement and being configured to convert rotational movement of the output shaft into the straight movement of the linear-motion member and apply thrust corresponding to the torque to the spool to change the position of the spool. The linear-motion member contacts the spool and pushes the spool against the biasing member to move the spool.

According to the above configuration, since the spool and the pressing member just contact each other and are not coupled to each other, the spool and the pressing member can be separately assembled. Therefore, the spool valve device is easily assembled. Further, since the pressing member pushes the spool against the basing spring, the pressing member can be brought into contact with the spool at all times. Therefore, the spool can be moved to a desired position by adjusting the position of the pressing member. As above, the movement of the spool to the desired position can be achieved by the above-described simple configuration.

In the above invention, at least one of the plurality of channels of the housing may be connected to a hydraulic pump configured to discharge an operating liquid and a hydraulic actuator configured to operate by being supplied with the operating liquid. When the spool is located at a fail safe position that is a most offset position in a direction in which the biasing member biases the spool, the spool may block the at least one channel connected to the hydraulic pump and the hydraulic actuator.

According to the above configuration, when the drive current input to the electric motor is stopped at the time of, for example, the occurrence of the abnormality, the spool moves to the fail safe position. Therefore, the flow of the operating liquid to the hydraulic actuator can be stopped, and this can stop the hydraulic actuator.

Advantageous Effects of Invention

The present invention can detect the operation abnormality of the spool without increasing the number of parts.

BRIEF DESCRIPTION OF DRAWINGS

FIG. 3A shows that a spool is located at a first offset position, and FIG. 2 shows that the spool is located at a second offset position.

DESCRIPTION OF EMBODIMENTS

Figure 1:
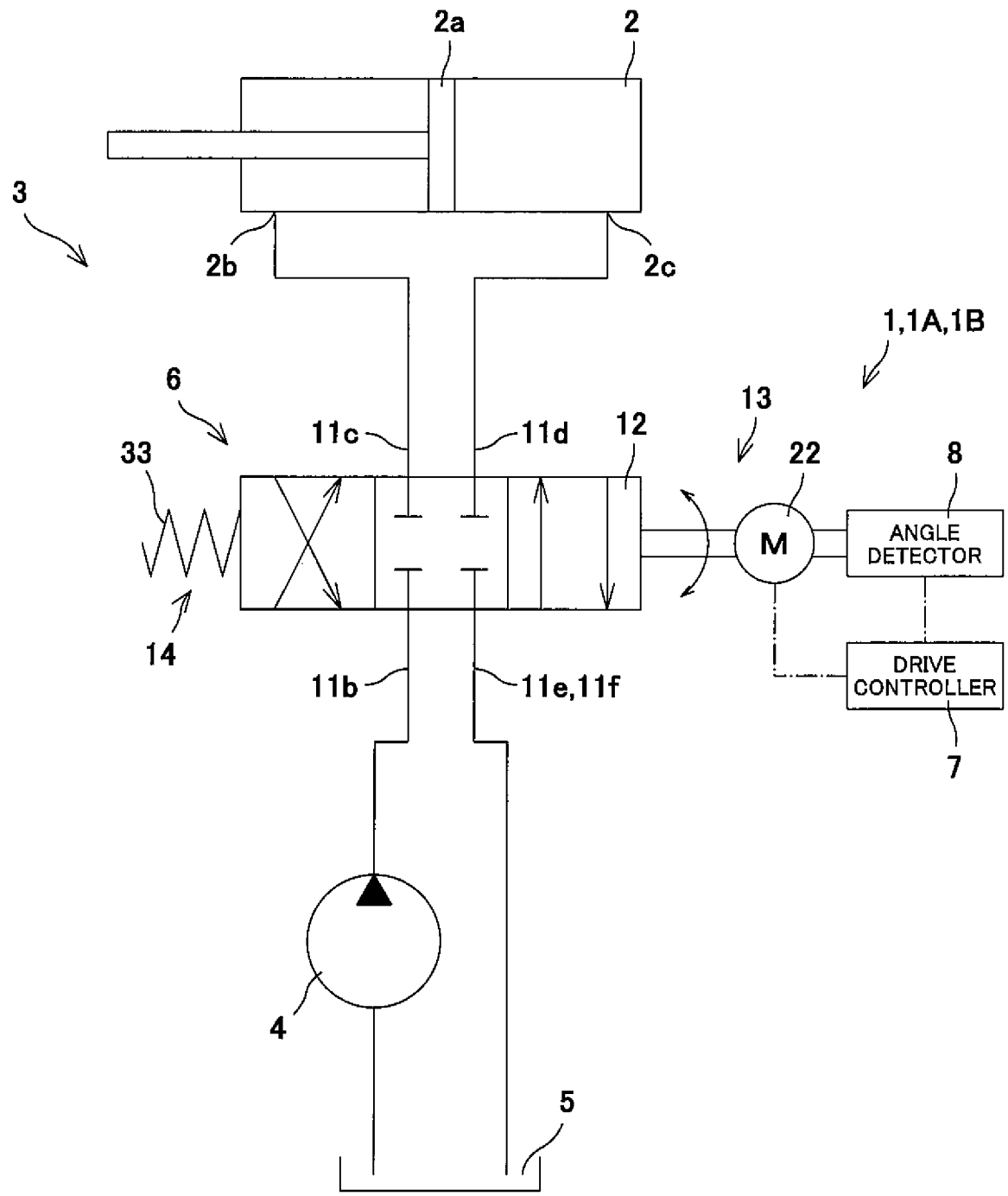
FIG. 1 is a hydraulic circuit diagram showing a hydraulic pressure supply apparatus including a spool valve device according to each of Embodiments 1 to 3.

Hereinafter, spool valve devices 1 and 1A to 1D according to Embodiments 1 to 5 of the present invention will be described with reference to the drawings. It should be noted that directions stated in the following description are used for convenience sake, and directions and the like of components of the present invention are not limited. Each of the spool valve devices 1 and 1A to 1D described below is just one embodiment of the present invention. Therefore, the present invention is not limited to the embodiments, and additions, deletions, and modifications may be made within the scope of the present invention.

Embodiment 1

Industrial machines, such as construction machines, can perform various work, such as excavating work and carrying work, and include various components for performing such work. For example, a hydraulic excavator that is one example of the construction machine includes a bucket as an attachment and further includes a boom and an arm to move the bucket. Further, hydraulic actuators are attached to the boom, the arm, and the bucket to move the boom, the arm, and the bucket. One example of the hydraulic actuator is a hydraulic cylinder 2 shown in FIG. 1. It should be noted that the hydraulic actuator is not limited to the hydraulic cylinder and may be, for example a hydraulic motor and is only required to be a component that can be driven by an operating liquid. The hydraulic cylinder 2 includes a rod 2a and makes the rod 2a reciprocate in accordance with a flow direction of the operating liquid supplied to the hydraulic cylinder 2. More specifically, the hydraulic cylinder 2 includes two ports 2b and 2c. When the operating liquid is supplied to the port 2b, the rod 2a retreats. When the operating liquid is supplied to the port 2c, the rod 2a advances. A hydraulic pressure supply apparatus 3 is connected to the hydraulic cylinder 2 configured as above.

The hydraulic pressure supply apparatus 3 can supply the operating liquid to the two ports 2b and 2c and includes a hydraulic pump 4 and the spool valve device 1. In the present embodiment, for convenience of explanation, the hydraulic pressure supply apparatus 3 is connected to only one hydraulic cylinder 2. However, the hydraulic pressure supply apparatus 3 may be connected to other actuators, such as hydraulic cylinders and hydraulic motors. When the hydraulic pressure supply apparatus 3 is connected to a plurality of actuators, the hydraulic pressure supply apparatus 3 includes the spool valve devices 1 corresponding to the respective actuators and also includes a plurality of hydraulic pumps 4. The hydraulic pump 4 is, for example, a swash plate pump and sucks the operating liquid from a tank 5 and discharges the operating liquid. The hydraulic pump 4 is connected to the spool valve device 1, and the operating liquid discharged from the hydraulic pump 4 is introduced to the spool valve device 1.

Figure 2:
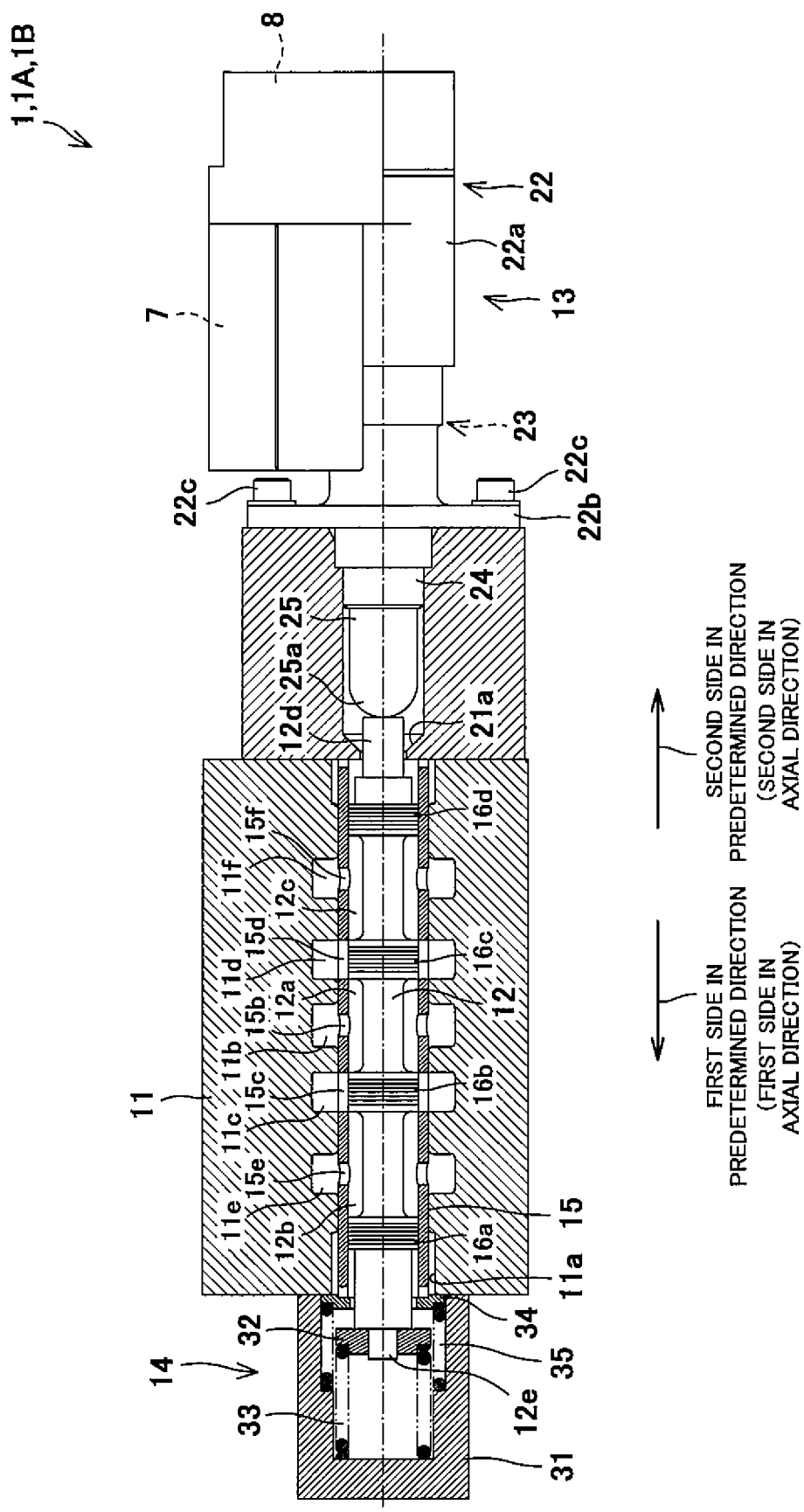
FIG. 2 is a sectional view showing the spool valve device of FIG. 1.

The spool valve device 1 is a valve device including a so-called direction switching valve. The spool valve device 1 supplies the operating liquid to the two ports 2b and 2c while switching the flow direction of the operating liquid and adjusts the flow rate of the operating liquid supplied to the hydraulic cylinder 2. The spool valve device 1 having such function includes a spool valve 6, a drive controller 7, and an angle detector 8. The spool valve 6 is a linear-motion electric spool valve and is configured to change the flow direction and flow rate of the operating liquid. More specifically, as shown in FIG. 2, the spool valve 6 includes a housing 11, a spool 12, an electric actuator 13, and a spring mechanism 14.

The housing 11 is, for example, a valve block. A spool hole 11a and a plurality of liquid passages (in the present embodiment, five liquid passages) 11b to 11f are formed on the housing 11. The spool hole 11a extends in a predetermined direction so as to penetrate the housing 11. The five liquid passages 11b to 11f are connected to the spool hole 11a at different positions. More specifically, the five liquid passages are a pump passage 11b, a rod-side passage 11c, a bottom-side passage 11d, and tank passages 11e and 11f. The pump passage 11b is connected to the spool hole 11a at a middle position of the spool hole 11a in the predetermined direction or its vicinity. The rod-side passage 11c is connected to the spool hole 11a at a first side of the pump passage 11b in the predetermined direction. The bottom-side passage 11d is connected to the spool hole 11a at a second side of the pump passage 11b in the predetermined direction. The tank passage 11e is connected to the spool hole 11a at a position outside the rod-side passage 11c in the predetermined direction. The tank passage 11f is connected to the spool hole 11a at a position outside the bottom-side passage 11d in the predetermined direction. The pump passage 11b is connected to the hydraulic pump 4. The rod-side passage 11c is connected to the port 2b of the hydraulic cylinder 2. The bottom-side passage 11d is connected to the port 2c of the hydraulic cylinder 2. Further, the tank passages 11e and 11f meet at a position away from the spool hole 11a and are then connected to the tank 5. As above, the hydraulic pump 4, the hydraulic cylinder 2, and the tank 5 are connected to the spool hole 11a by the five liquid passages 11b to 11f. The spool 12 is inserted into the spool hole 11a through a sleeve 15.

The sleeve 15 is formed in a substantially cylindrical shape. An outer diameter of the sleeve 15 is substantially equal to a diameter of the spool hole 11a, and the sleeve 15 and an inner surface of the housing 11 (i.e., a surface that defines the spool hole 11a) is liquid-tight. Communication holes 15b to 15f are formed on the sleeve 15 at respective positions corresponding to the passages 11b to 11e. The passages 11b to 11e and an inside of the sleeve 15 communicate with each other through the communication holes 15b to 15f. The spool 12 is inserted in the sleeve 15 so as to be slidable in the predetermined direction.

The spool 12 is a substantially columnar member extending in an axial direction of the spool 12. The spool 12 changes connection statuses of the passages 11b to 11e in accordance with the position of the spool 12. To be specific, four rounds 16a to 16d are formed on an outer peripheral surface of the spool 12. Each of the four rounds 16a to 16d of the spool 12 is larger in diameter than the other portion of the spool 12. The four rounds 16a to 16d are arranged away from one another in the axial direction on the spool 12. Each of circumferential grooves 12a to 12c is formed on the spool 12 so as to be located between the adjacent rounds (16a to 16d). These three circumferential grooves 12a, 12b, and 12c are arranged so as to respectively face the pump passage 11b, the tank passage 11e, and the tank passage 11f. Further, each of outer diameters of the four rounds 16a to 16d is substantially equal to an inner diameter of the sleeve 15, and the four rounds 16a to 16d liquid-tightly contact an inner peripheral surface of the sleeve 15. Therefore, the spool 12 slides on the inner peripheral surface of the sleeve 15 while realizing seal between the adjacent circumferential grooves (12a to 12c).

Figure 3A:
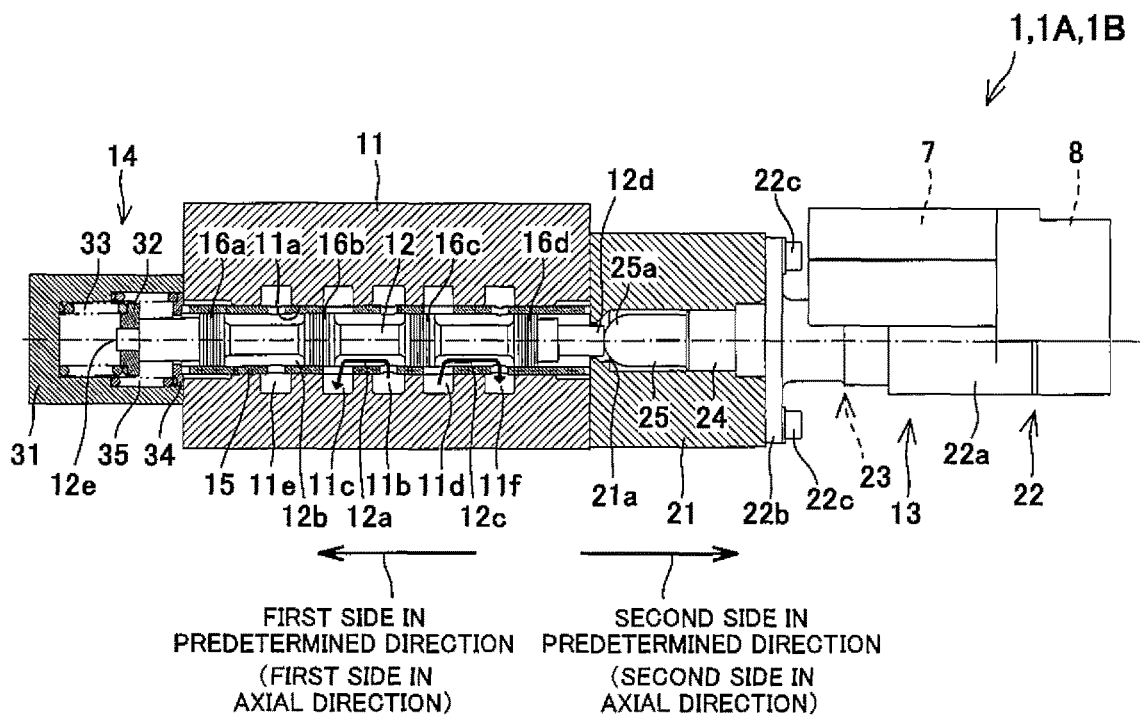
FIGS. 3A and 3B are sectional views showing operations of the spool valve device shown in FIG. 2.
Figure 3B:
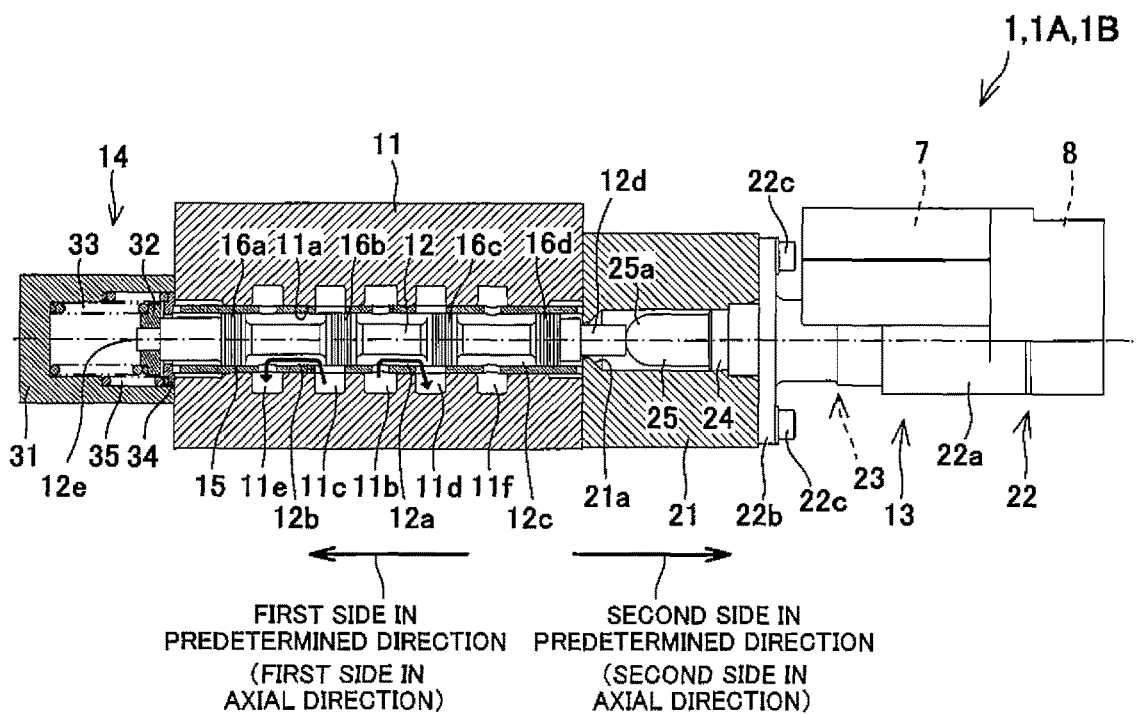

The two rounds 16b and 16c are located in the vicinity of a middle position among the four rounds 16a to 16d. When the spool 12 is located at a neutral position as shown in FIG. 2, the two rounds 16b and 16c close the rod-side passage 11c and the bottom-side passage 11d, respectively. When the spool 12 moves to the first side or second side in the predetermined direction, the two rounds 16b and 16c open the corresponding passages 11c and 11d, and each of the passages 11c and 11d is connected to the pump passage 11b or the tank passage 11e or 11f. For example, when the spool 12 moves to the first side in the predetermined direction, i.e., to a first offset position (see FIG. 3A), the rod-side passage 11c is connected to the pump passage 11b through the circumferential groove 12a, and the bottom-side passage 11d is connected to the tank passage 11f through the circumferential groove 12c. In contrast, when the spool 12 moves to the second side in the predetermined direction, i.e., to a second offset position (see FIG. 3B), the rod-side passage 11c is connected to the tank passage 11e through the circumferential groove 12b, and the bottom-side passage 11d is connected to the pump passage 11b through the circumferential groove 12a. An opening degree of the rod-side passage 11c and an opening degree of the bottom-side passage 11d change by the movement of the spool 12. Therefore, the opening degrees of the passages 11c and 11d can be adjusted by changing the position of the spool 12. On this account, the spool 12 can supply the operating liquid in the flow direction corresponding to the position of the spool 12 at the flow rate corresponding to the position of the spool 12. A first axial end portion 12d and second axial end portion 12e of the spool 12 project from the housing 11. The electric actuator 13 is provided at the first axial end portion 12d of the spool 12, and the spring mechanism 14 is provided at the second axial end portion 12e of the spool 12.

The electric actuator 13 is a so-called linear-motion electric actuator. When the electric actuator 13 is supplied with electric power, the electric actuator 13 makes the spool 12 reciprocate in the predetermined direction (i.e., the axial direction). To be specific, the electric actuator 13 includes a motor-side casing 21, an electric motor 22, and a linear-motion conversion mechanism 23. The motor-side casing 21 is substantially cylindrical. A first axial opening portion of the motor-side casing 21 covers the first axial end portion 12d of the spool 12. Further, an opening end of the motor-side casing 21 is brought into contact with a second axial side surface of the housing 11, and in this state, the motor-side casing 21 is fastened to the housing 11. The motor-side casing 21 arranged as above extends in the axial direction. The electric motor 22 is attached to a second axial opening end of the motor-side casing 21 through the linear-motion conversion mechanism 23.

The electric motor 22 is a so-called servomotor and includes a casing 22a, a stator (not shown), and a rotor (not shown; including an output shaft). The casing 22a is formed in a substantially bottomed cylindrical shape. An opening end portion of the casing 22a is inserted into the motor-side casing 21. A flange 22b is formed at an opening-end side surface portion of the casing 22a. The flange 22b projects outward in a radial direction over the entire periphery in a circumferential direction. The flange 22b of the casing 22a is brought into contact with the second axial opening end of the motor-side casing 21, and the casing 22a is fastened to the motor-side casing 21 by a plurality of bolts 22c inserted through the flange 22b.

The stator in which the rotor is inserted is accommodated in the casing 22a arranged as above. The stator is connected to the drive controller 7 described below in detail and rotates the rotor by torque corresponding to a drive current supplied from the drive controller 7. In addition to the stator and the rotor, the casing 22a accommodates some of components of the linear-motion conversion mechanism 23. The linear-motion conversion mechanism 23 is attached to a tip end portion of the rotor projecting from the stator.

The linear-motion conversion mechanism 23 is a mechanism configured to: convert rotational movement of the rotor into straight movement; generate thrust corresponding to the above torque; and apply the trust to the spool 12 to change the position of the spool. The linear-motion conversion mechanism 23 is, for example, a ball screw mechanism and includes a ball screw (not shown), an intermediate member 24, and a piston 25. The ball screw is configured such that a nut is threadedly engaged with a rod-shaped screw shaft extending in the axial direction. The screw shaft rotates integrally with the rotor. When the screw shaft is rotated by the electric motor 22, the nut moves along the screw shaft toward the first side or second side in the axial direction. The piston 25 is attached to the nut of the ball screw through the intermediate member 24.

Although not shown in detail, the intermediate member 24 is formed in a substantially bottomed tubular shape, and the nut is fitted to an opening portion of the intermediate member 24. A tip end portion of the intermediate member 24 projects into the motor-side casing 21 from the opening end portion of the casing 22a. An outer diameter of the tip end portion of the intermediate member 24 is substantially equal to an inner diameter of the motor-side casing 21. The tip end portion of intermediate member 24 slides in the motor-side casing 21 toward the first side or second side in the axial direction in conjunction with the nut. A screw portion (not shown) is formed at the tip end portion of the intermediate member 24, and the piston 25 is threadedly engaged with the screw portion.

The piston 25 that is one example of a pressing member is formed in a substantially columnar shape. The piston 25 is arranged in the motor-side casing 21 so as to be movable to the first side and second side in the axial direction. The piston 25 extends from the intermediate member 24 to the spool 12 in the axial direction, and a tip end portion 25a of the piston 25 contacts the first axial end portion 12d of the spool 12. With this, the thrust converted by the ball screw is applied to the spool 12, and this can move the spool 12. The tip end portion 25a of the piston 25 is formed in a partially spherical shape (in the present embodiment, a semi-spherical shape), and this allows misalignment or inclination between an axis of the piston 25 and an axis of the spool 12. As above, the piston 25 applies the thrust to the spool 12 to push the spool 12. The spring mechanism 14 is provided at the second axial end portion 12e of the spool 12 so as to apply force against such pushing force (i.e., the thrust).

The spring mechanism 14 includes a spring-side casing 31, a spring receiver 32, and a coil spring 33. The spring-side casing 31 is a substantially bottomed tubular member. The spring-side casing 31 is fastened to a first axial side surface of the housing 11 such that an opening portion of the spring-side casing 31 covers the second axial end portion 12e of the spool 12. The spring-side casing 31 accommodates the spring receiver 32 and the coil spring 33. The spring receiver 32 is formed in a substantially annular shape, and the second axial end portion 12e is fitted in an inner hole of the spring receiver 32. The second axial end portion 12e of the spool 12 is smaller in diameter than the other portion of the spool 12. By fitting the spring receiver 32 to the second axial end portion 12e, the spring receiver 32 is externally attached to the second axial end portion 12e. A main surface of the spring receiver 32 arranged as above is opposed to an inner bottom surface of the spring-side casing 31, and the coil spring 33 is interposed between these two opposing surfaces. The coil spring 33 is a so-called compression coil spring and is interposed between the two opposing surfaces in a compressed state. With this, biasing force against the thrust acts on the spool 12 through the spring receiver 32 by the coil spring 33.

A spacer 34 having a substantially circular plate shape is externally attached to the spool 12 so as to be located between the round 16a and the spring receiver 32 with a gap between the spacer 34 and the round 16a and a gap between the spacer 34 and the spring receiver 32, the round 16a being located on the outer peripheral surface of the spool 12 and at the most first side in the axial direction. An outer diameter of the spacer 34 is larger than a diameter of the spool hole 11a. The spacer 34 is arranged in the spring-side casing 31 so as to be located in the vicinity of an opening end of the spring-side casing 31. A basing spring 35 is provided at the spacer 34, and the spacer 34 is pressed against a first axial end surface of the housing 11 by the basing spring 35. Further, a portion of an inner hole of the motor-side casing 21 is formed in a tapered shape and forms a tapered surface 21a, the portion being located in the vicinity of an opening formed close to the housing 11. When the piston 25 moves to the first side in the axial direction, the tip end portion 25a contacts the tapered surface 21a, and therefore, the piston 25 cannot push the spool 12 to the first side in the axial direction any more.

In the spool valve 6 configured as above, when the rotor of the electric motor 22 is rotated, and this moves the piston 25 of the linear-motion conversion mechanism 23, the thrust is applied to the spool 12, and this can change the position of the spool 12. The position of the spool 12 is determined based on the thrust applied to the spool 12. As described above, the thrust is determined based on the torque of the electric motor 22. The electric motor 22 generates the torque corresponding to the drive current supplied to the stator. In order to supply the drive current to the stator, the drive controller 7 is electrically connected to the electric motor 22.

The drive controller 7 controls the electric motor 22. In the present embodiment, the drive controller 7 is accommodated in the casing 22a. The drive controller 7 having such function is connected to a control device and an electric power supply source (both not shown). The control device is connected to the drive controller 7 through, for example, CAN communication and outputs a position command to the drive controller 7. It should be noted that the position command is a command that is input to the drive controller 7 to make the hydraulic cylinder 2 perform a desired operation, and is a command value regarding the position of the spool 12. Further, the electric power supply source is a power supply source for the electric motor 22 and the drive controller 7. The drive controller 7 drives the electric motor 22 by using electric power supplied from the electric power supply source.

The angle detector 8 is attached to the electric motor 22 to perform feedback control of an angular position of the rotor at the time of driving. The angle detector 8 is, for example, a resolver or an encoder. As with the drive controller 7, the angle detector 8 is accommodated in the casing 22a. The angle detector 8 detects the angular position of the rotor. The drive controller 7 controls the electric motor 22 by using information of the angular position detected by the angle detector 8. The drive controller 7 calculates the position of the spool from the information of the angular position. The drive controller 7 performs feedback control of the position of the spool 12 (i.e., performs positioning control of the spool 12) such that the spool 12 moves to a position corresponding to the position command input to the drive controller 7.

In the spool valve device 1 configured as above, a necessary drive current is supplied from the drive controller 7 to the electric motor 22 to hold the spool 12 at the neutral position and stop the hydraulic cylinder 2. When moving the spool 12 from the neutral position to the first offset position, the drive controller 7 increases the drive current supplied to the electric motor 22 to apply larger thrust to the spool 12 and thereby move the spool 12 to the first side in the axial direction. Further, when returning the spool 12 from the first offset position to the neutral position, the drive controller 7 decreases the drive current supplied to the electric motor 22 to reduce the thrust applied to the spool 12. With this, the spool 12 is pushed by the biasing force of the coil spring 33 to return to the neutral position. In contrast, when moving the spool 12 from the neutral position to the second offset position, the drive controller 7 decreases the drive current supplied to the electric motor 22 to reduce the thrust applied to the spool 12. With this, the spool 12 is pushed by the biasing force of the coil spring 33 to move to the second side in the axial direction. Further, when returning the spool 12 from the second offset position to the neutral position, the drive controller 7 increases the drive current supplied to the electric motor 22 to increase the thrust applied to the spool 12. With this, the spool 12 is pushed by the biasing force of the coil spring 33 to return to the neutral position. As above, the drive controller 7 can operate the spool 12 by controlling the drive current supplied to the electric motor 22 and can also determine the presence or absence of operation abnormality of the spool 12.

The drive controller 7 that also serves as an abnormality determining portion determines the presence or absence of the operation abnormality of the spool 12 based on the drive current supplied from the drive controller 7 to the stator and the angular position detected by the angle detector 8. Specifically, thrust F of the electric actuator 13 contains a component F1 and a component F2. The component F1 acts against the biasing force of the coil spring 33, the biasing force changing in accordance with a compression amount of the coil spring 33. The component F2 accelerates or decelerates the spool 12. The biasing force of the coil spring 33 changes with respect to the compression amount, i.e., a position x of the spool 12 (one example is that: a neutral position x is zero; positions at the first side in the axial direction correspond to positive values; and positions at the second side in the axial direction correspond to negative values). Therefore, the component F1 against the biasing force can be represented by a function "F1=$f_1(x)$" as a variable of the position x of the spool 12. Further, the component F2 that accelerates or decelerates the spool 12 changes with respect to an acceleration-deceleration value $\alpha$ calculated based on the position command input to the drive controller 7. Therefore, the component F2 can be represented by a function "F2=$f_2(\alpha, J)$" including the acceleration-deceleration value $\alpha$ as a variable. Therefore, in the process of moving the spool 12, the thrust F to be output from the electric actuator 13 in accordance with the position command can be calculated based on the above functions (i.e., F=F1+F2=$f_1(x)+f_2(\alpha, J)$). The thrust is a value (i.e., I=f(F)) determined in accordance with a drive current I to be supplied to the electric motor 22. Therefore, a reference drive current $I_{ref}$ to be input to the electric motor 22 is calculated in accordance with the position of the spool 12 and the position command input to the drive controller 7. The reference drive current $I_{ref}$ is a value obtained by adding a second drive current to a first drive current. The first drive current is a current to be input to the electric motor 22 to move the spool 12 to each position, and the second drive current is a current to be input to the electric motor 22 to accelerate the spool 12 at each acceleration speed.

The position of the spool 12 can be calculated as below. To be specific, the spool 12 contacts the piston 25 at all times by the coil spring 33, and the movement distance of the piston 25 and the position of the spool 12 correspond to each other one to one. Further, the piston 25 is coupled to the rotor of the electric motor 22 through the ball screw, and the movement distance of the piston 25 and the angular position of the rotor correspond to each other one to one. To be specific, the position of the spool 12 and the angular position of the rotor correspond to each other one to one, and the position of the spool 12 can be calculated based on the angular position of the rotor. The reference drive current $I_{ref}$ to be input to the electric motor is calculated based on the position of the spool 12 calculated as above.

Further, the drive controller 7 also detects the drive current actually supplied to the electric motor 22. The drive controller 7 compares an actual drive current $I_{real}$ as the detected drive current with the reference drive current $I_{ref}$. To be specific, the drive controller 7 calculates a difference between the actual drive current $I_{real}$ and the reference drive current $I_{ref}$. When this difference falls within a predetermined range, the drive controller 7 determines that the spool 12 is normally operating. In contrast, when the difference is large, the drive controller 7 determines that the spool 12 cannot move, or operation abnormality (such as disconnection between the drive controller 7 and the electric motor 22) has occurred at the spool 12.

The drive controller 7 having such function is connected to an external device, such as the above-described control device, through CAN communication or the like. When the drive controller 7 detects the operation abnormality of the spool 12, the drive controller 7 outputs such detection to the control device. Further, the drive controller 7 performs the following operation in accordance with a determination result indicating the presence of the operation abnormality of the spool 12. For example, the drive controller 7 repeatedly increases and decreases the drive current supplied to the electric motor 22 so as to change the drive current. Thus, the drive controller 7 makes the spool 12 reciprocate slightly. With this, the spool 12 in a sticking state in the housing 11 may return to an original state (i.e., a non-sticking state). Further, when the spool 12 does not return to the original state even after the spool 12 is made to reciprocate slightly in a predetermined period of time, electric power supply from the drive controller 7 to the electric motor 22 is stopped, and error history regarding the operation abnormality of the spool valve 6 is stored in the drive controller 7.

In the spool valve device 1 configured as above, since the electric actuator 13 including the linear-motion conversion mechanism 23 applies the thrust to the spool 12 to move the spool 12, the angular position of the rotor of the electric motor 22 and the position of the spool 12 correspond to each other. Therefore, the drive controller 7 can determine the presence or absence of the operation abnormality of the spool 12 by using the angle detector 8 provided to control the electric motor 22. On this account, the presence or absence of the operation abnormality can be determined without newly providing a position sensor configured to detect the position of the spool 12. Thus, the presence or absence of the operation abnormality of the spool 12 can be determined without increasing the number of parts of the spool valve device 1. Further, in the spool valve device 1, since the presence or absence of the operation abnormality of the spool can be determined based on the angular position detected by the angle detector 8 and the actual drive current actually input by the drive controller 7, the increase in the number of parts can be suppressed. Furthermore, in the spool valve device 1, the presence or absence of the operation abnormality in the spool valve 6 can be determined only by detecting the angular position of the rotor and the actual drive current $I_{real}$ based on the reference drive current $I_{ref}$ calculated by the function. Therefore, a threshold for determination can be created without performing actual measurement and the like. Thus, the threshold is easily created.

In the spool valve device 1, since the spool 12 and the piston 25 just contact each other and are not coupled to each other, the spool 12 and the piston 25 can be separately assembled. Therefore, the spool valve device 1 is easily assembled. Further, since the piston 25 pushes the spool 12 against the coil spring 33, the piston 25 can be brought into contact with the spool 12 at all times. Therefore, the spool 12 can be moved to a desired position by adjusting the position of the piston 25. As above, the movement of the spool 12 to the desired position can be achieved by the above-described simple configuration.

Embodiment 2

The spool valve device 1A of Embodiment 2 is the same in configuration as the spool valve device 1 of Embodiment 1 but is different from the spool valve device 1 of Embodiment 1 regarding the abnormality determination performed by the drive controller 7. Therefore, regarding the components of the spool valve device 1A of Embodiment 2, the same reference signs as the components of the spool valve device 1 of Embodiment 1 are used, and a repetition of the same explanation is avoided. The following will describe only the abnormality determination.

In order to calculate the reference drive current $I_{ref}$ used when performing the abnormality determination, the drive controller 7 of the spool valve device 1A of Embodiment 2 stores a table described below. To be specific, the table shows a drive current $I_1$ to be supplied to the electric motor 22 to move the spool 12 to a predetermined position against the biasing force of the coil spring 33 (i.e., to generate the component F1 against the biasing force). The table is created as below. To be specific, first, as shown in FIG. 1, the hydraulic pressure supply apparatus 3 is assembled, and the hydraulic pressure supply apparatus 3 is connected to the hydraulic cylinder 2. Then, the drive current supplied to the electric motor 22 to move the spool 12 in the hydraulic pressure supply apparatus 3 is increased or decreased, and the first drive current $I_1$ supplied to move the spool 12 to the position x is detected. It should be noted that the table is mainly used to calculate the first drive current $I_1$ supplied to generate the component F1 of the thrust F. Therefore, when increasing or decreasing the drive current, to eliminate the influence of the component F2 of the thrust that accelerates or decelerates the spool 12, the drive current is gradually increased or decreased such that the spool 12 move at a constant and fixed speed. As above, the first drive currents $I_1$ for the respective positions x are detected, and the table is created by recording the first drive currents $I_1$ to be supplied for the respective positions x.

Further, the drive controller 7 calculates a second drive current $I_2$ based on a function "$f_2(a, J)$" as with Embodiment 1, the second drive current $I_2$ being supplied to the electric motor 22 to generate the thrust that accelerates or decelerates the spool 12, i.e., to generate the component F2. In the spool valve device 1A of Embodiment 2, the function "$f_2(a, J)$" is created as below. To be specific, as with when creating the table, the drive current supplied to the electric motor 22 to move the spool 12 in the hydraulic pressure supply apparatus 3 is increased or decreased. Further, when creating the function "$f_2(a, J)$," unlike when creating the table, the drive currents are supplied to the electric motor 22 in various increase-decrease patterns to operate the spool 12 in various acceleration-deceleration patterns, and these drive currents are detected. Further, the acceleration-deceleration value α of the spool 12 is calculated from a relative displacement magnitude of the spool 12 at the time of the detection, and the drive current supplied with respect to the acceleration-deceleration value α is stored, i.e., the drive current $I_2'$ is stored. Further, the thrust to be applied to the spool 12 to hold the spool 12 at an acceleration start position at the time of the detection is calculated from the table, i.e., the component F1 is calculated from the table. Then, the second drive current $I_2$ is calculated by subtracting the drive current $I_1$ from the detected drive current $I_2'$. The second drive current $I_2$ is the drive current to be supplied to the electric motor 22 when moving the spool 12 based on the acceleration-deceleration value α. The drive currents $I_2$ are calculated in various acceleration-deceleration patterns, and the function "$f_2(\alpha, J)$" is identified based on a plurality of drive currents $I_2$ calculated as above.

The drive controller 7 calculates the drive current $I_1$ based on the table and the position x of the spool 12 detected by the angle detector 8 and also calculates the drive current $I_2$ based on the function "$f_2(a, J)$" and the acceleration-deceleration value α calculated based on the position command. Then, the drive controller 7 adds the two drive currents $I_1$ and $I_2$ to calculate the reference drive current $I_{ref}$ to be supplied to the electric motor 22 in accordance with the position command input to the drive controller 7. The drive controller 7 compares the detected actual drive current $I_{real}$ with the reference drive current $I_{ref}$ and calculates a difference therebetween. When the difference falls within a predetermined range, the drive controller 7 determines that the spool valve 6 is normally operating. On the other hand, when the difference is large, the drive controller 7 determines that the spool 12 cannot move, or the operation abnormality (such as the disconnection between the drive controller 7 and the electric motor 22) has occurred at the spool 12.

According to the spool valve device 1A configured as above, the drive currents supplied to the electric motor 22 are actually measured in the actually-assembled hydraulic pressure supply apparatus 3 and the hydraulic cylinder 2. With this, the reference drive current $I_{ref}$ can be determined also in consideration of variations of the drive currents to be supplied for respective products. Thus, the operation abnormality can be determined more accurately.

Other than the above, the spool valve device 1A of Embodiment 2 has the same operational advantages as the spool valve device 1 of Embodiment 1.

Embodiment 3

The spool valve device 1B of Embodiment 3 is the same in configuration as the spool valve device 1 of Embodiment 1 but is different from the spool valve device 1 of Embodiment 1 regarding the abnormality determination performed by the drive controller 7. Therefore, regarding the components of the spool valve device 1B of Embodiment 3, the same reference signs as the components of the spool valve device 1 of Embodiment 1 are used, and a repetition of the same explanation is avoided. The following will describe only the abnormality determination.

The drive controller 7 of the spool valve device 1B of Embodiment 3 determines the presence or absence of the operation abnormality of the spool 12 based on the position command input to the drive controller 7 and the position x of the spool 12 calculated based on a signal from the angle detector 8. Further, when performing the determination, the drive controller 7 creates a threshold for determining the presence or absence of the operation abnormality as below. To be specific, as shown in FIG. 1, the hydraulic pressure supply apparatus 3 is assembled, and the hydraulic pressure supply apparatus 3 is connected to the hydraulic cylinder 2. Then, the drive controller 7 operates the spool 12 in accordance with the position command input to the drive controller 7 to drive the hydraulic cylinder 2. At this time, the position command is input in various modes to the drive controller 7 to operate the hydraulic cylinder 2 in various modes. For example, the input position command is increased or decreased at a predetermined increase-decrease rate to move the spool 12 to a desired position, and the increase-decrease rate is changed. Then, the position x of the spool 12 is calculated based on the angular position detected by the angle detector 8, and a deviation amount between the position x and the position command is calculated. Then, a largest one of a plurality of deviation amounts calculated with respect to the position commands input in various modes is stored as the threshold.

Then, in the determination of the operation abnormality, the drive controller 7 calculates the deviation amount between the position command input during operation and the position x of the spool 12 and compares the deviation amount with the threshold. When the deviation amount is the threshold or less, the drive controller 7 determines that the spool valve 6 is normally operating. On the other hand, when the deviation amount is larger than the threshold, the drive controller 7 determines that the spool 12 cannot move, or the operation abnormality (such as the disconnection between the drive controller 7 and the electric motor 22) has occurred at the spool valve 6.

The spool valve device 1B configured as above compares the position command with the actual movement of the spool 12 and determines the presence or absence of the operation abnormality of the spool valve 6. Therefore, the determination of the operation abnormality can be performed more accurately.

Other than the above, the spool valve device 1A of Embodiment 3 has the same operational advantages as the spool valve device 1 of Embodiment 1.

Embodiment 4

The spool valve device 1C of Embodiment 4 is similar in configuration to the spool valve device 1 of Embodiment 1. Therefore, components of the spool valve device 1C of Embodiment 4 which are different from the components of the spool valve device 1 of Embodiment 1 will be mainly described. The same reference signs are used for the same components, and a repetition of the same explanation is avoided.

Figure 4:
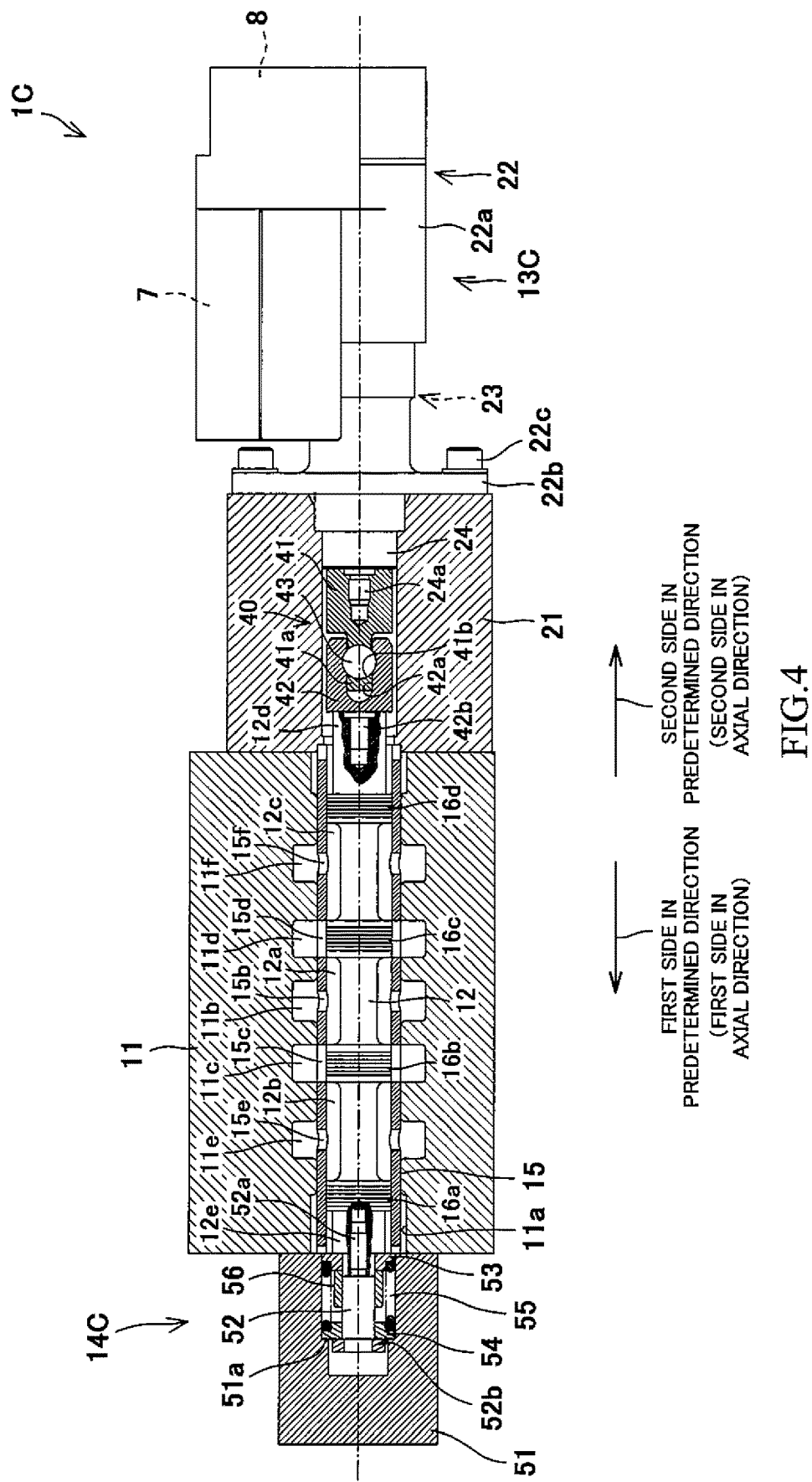
FIG. 4 is a sectional view showing a spool valve device according to Embodiment 4.

As shown in FIG. 4, the spool valve device 1C of Embodiment 4 includes a spool valve 6C, the drive controller 7, and the angle detector 8. The spool valve 6C is a linear-motion electric spool valve and is configured to switch the flow direction of the operating liquid and change the flow rate of the operating liquid. More specifically, the spool valve 6 includes the housing 11, the spool 12, an electric actuator 13C, and a spring mechanism 14C.

The electric actuator 13C includes the motor-side casing 21, the electric motor 22, and a linear-motion conversion mechanism 23C. The linear-motion conversion mechanism 23C includes the ball screw (not shown), the intermediate member 24, and a coupling member 40. The coupling member 40 is a member configured to couple the intermediate member 24 and the spool 12. The coupling member 40 is threadedly engaged with the screw portion of the intermediate member 24. The coupling member 40 is configured such that to allow misalignment of the spool 12 relative to the ball screw, the spool 12 can incline and slide with respect to the ball screw in all directions perpendicular to the axial direction. More specifically, the coupling member 40 is a so-called ball joint and includes a motor-side coupling portion 41, a spool-side coupling portion 42, and a ball 43.

The motor-side coupling portion 41 is formed in a substantially columnar shape. A screw portion 24a of the intermediate member 24 is threadedly engaged with the first axial end portion 12d of the motor-side coupling portion 41. The motor-side coupling portion 41 includes a projecting portion 41a at the second side in the axial direction. The projecting portion 41a is formed in a substantially flat plate shape, and the spool-side coupling portion 42 is attached to the projecting portion 41a. The spool-side coupling portion 42 is formed in a substantially columnar shape, and an insertion groove 42a is formed at a first axial end of the spool-side coupling portion 42. The insertion groove 42a extends toward the first side in the axial direction and penetrates the spool-side coupling portion 42 in the radial direction. By the insertion groove 42a, the spool-side coupling portion 42 is formed in a substantially U shape in a side view seen from the radial direction in which the insertion groove 42a penetrates the spool-side coupling portion 42. The spool-side coupling portion 42 includes a screw portion 42b at a second axial end side. The spool 12 and the spool-side coupling portion 42 are coupled to each other in such a manner that the screw portion 42b is threadedly engaged with the first axial end portion of the spool 12.

These two coupling portions 41 and 42 configured as above are coupled to each other as below. To be specific, the projecting portion 41a of the motor-side coupling portion 41 is inserted into the insertion groove 42a of the spool-side coupling portion 42. A fitting hole 41b is formed in the vicinity of a middle of the projecting portion 41a. The fitting hole 41b penetrates the projecting portion 41a in a thickness direction (i.e., the radial direction) of the projecting portion 41a. The ball 43 having a substantially spherical shape is fitted in the fitting hole 41b. Further, a portion of the insertion groove 42a of the spool-side coupling portion 42 which portion corresponds to the fitting hole 41b is formed to be curved outward in a width direction of the insertion groove 42a, and the ball 43 can be fitted in this portion of the insertion groove 42a. To be specific, the projecting portion 41a in which the ball 43 is fitted in the fitting hole 41b can be inserted into the insertion groove 42a of the spool-side coupling portion 42, and the motor-side coupling portion 41 and the spool-side coupling portion 42 are engaged with each other by the ball 43. With this, the coupling member 40 is constituted as the ball joint, and the ball screw and the spool 12 are coupled to each other so as to be able to incline and slide in all directions perpendicular to the axial direction by the coupling member 40.

The electric actuator 13C configured as above is coupled to the spool 12 by the coupling member 40. In the electric actuator 13C, the rotational movement of the rotor of the electric motor 22 is converted into the straight movement (stroke movement) by the linear-motion conversion mechanism 23. With this, the spool 12 can be made to move to the first side or second side in the axial direction. To be specific, when the electric motor 22 is rotated to one side in the circumferential direction, and this moves the nut of the ball screw to the first side in the axial direction, the spool 12 can be made to move to the first side in the axial direction. On the other hand, when the electric motor 22 is rotated to the other side in the circumferential direction, and this moves the nut of the ball screw to the second side in the axial direction, the spool 12 can be made to move to the second side in the axial direction.

In the spool valve device 1C configured as above, the drive controller 7 calculates the position of the spool based on the information of the angular position detected by the angle detector 8. Then, the drive controller 7 controls the electric motor 22 based on the calculated position of the spool and the position command and makes the electric actuator 13C move the spool 12 to the first side or second side in the axial direction, i.e., performs the positioning control of the spool 12. The spool valve device 1C controls the flow direction and flow rate of the operating liquid by performing the positioning control of the spool 12 as above.

In the spool valve device 1C, the electric actuator 13C and the spool 12 are coupled to each other by the coupling member 40. Therefore, even if the spool 12 is misaligned with respect to the ball screw, the generation of bending moment when the thrust is applied to the spool 12 by the electric actuator 13C can be suppressed, and the spool 12 can be maintained in a straight state along the spool hole 11a. To be specific, the spool 12 can be prevented from being pressed against an inner peripheral surface of the housing 11. As above, the first axial end portion of the spool 12 is coupled to the electric actuator 13C, and the spring mechanism 14C is provided at the second axial end portion 12e of the spool 12.

The spring mechanism 14C is included in the spool valve device 1C in order that the spring mechanism 14C returns the spool 12 to the neutral position when the electric actuator 13C fails. The spring mechanism 14C includes a spring-side casing 51, a driven body 52, a first spring receiving member 53, a second spring receiving member 54, a coil spring 55, and a stopper member 56. The spring-side casing 51 is a substantially bottomed tubular member. The spring-side casing 51 is fastened to the first axial side surface of the housing 11 such that an opening portion of the spring-side casing 51 faces a first axial opening of the spool hole 11a. The spring-side casing 51 arranged as above accommodates the driven body 52, the first spring receiving member 53, the second spring receiving member 54, the coil spring 55, and the stopper member 56.

The driven body 52 is a substantially rod-shaped member and includes a screw portion 52a at a tip end side thereof. The driven body 52 is attached to the spool 12 in such a manner that the screw portion 52a is threadedly engaged with the second axial end of the spool 12. The driven body 52 is arranged substantially coaxially with the spool 12 and extends toward the first side in the axial direction so as to project from the spool 12. The driven body 52 includes a flange portion 52b at a base end side thereof. The first spring receiving member 53, the second spring receiving member 54, the coil spring 55, and the stopper member 56 are externally attached to an intermediate portion between the flange portion 52b and the screw portion 52a.

Each of the first spring receiving member 53 and the second spring receiving member 54 is formed in a substantially annular shape. The driven body 52 is inserted into an inner hole of the first spring receiving member 53 and an inner hole of the second spring receiving member 54. To be specific, the first spring receiving member 53 and the second spring receiving member 54 are externally attached to the driven body 52 and are arranged away from each other in the axial direction. The coil spring 55 is interposed between the first spring receiving member 53 and the second spring receiving member 54. The first spring receiving member 53 is biased by the coil spring 55 toward the second side in the axial direction, and the second spring receiving member 54 is biased by the coil spring 55 toward the first side in the axial direction. An outer diameter of the first spring receiving member 53 biased as above is smaller than the diameter of the spool hole 11a and larger than the inner diameter of the sleeve 15. Since the first spring receiving member 53 is biased, an outer peripheral edge of the first spring receiving member 53 is pressed against a first axial end portion of the sleeve 15. A bottom-side portion of an inner peripheral surface of the spring-side casing 51 is made smaller in diameter than the other portion of the inner peripheral surface of the spring-side casing 51. With this, a step portion 51a is formed on the inner peripheral surface of the spring-side casing 51 over the entire periphery in the circumferential direction. An outer peripheral edge of the second spring receiving member 54 contacts the step portion 51a. To be specific, the biased second spring receiving member 54 is pressed against the step portion 51a.

In the spring mechanism 14C configured as above, when the spool 12 is moved by the electric actuator 13C from the neutral position shown in FIG. 4 to the first side in the axial direction, the first spring receiving member 53 is pushed by the spool 12 to move to the first side in the axial direction. On the other hand, since the outer peripheral edge portion of the second spring receiving member 54 is supported by the step portion 51a, the second spring receiving member 54 cannot move and is maintained at the same position. With this, a space between the two spring receiving members 53 and 54 narrows, and the coil spring 55 is compressed. Thus, the coil spring 55 applies biasing force to the spool 12 through the first spring receiving member 53 and the driven body 52 in such a direction that the spool 12 returns to the neutral position. With this, when the electric actuator 13C fails, the spool 12 is made to return to the neutral position by the coil spring 55.

For example, when the spool 12 is moved from the neutral position to the second side in the axial direction by the electric actuator 13C, the second spring receiving member 54 is moved to the second side in the axial direction by the flange portion 52b. On the other hand, since the outer peripheral edge of the first spring receiving member 53 contacts the sleeve 15, the first spring receiving member 53 cannot move and is maintained at the same position. With this, the space between the two spring receiving members 53 and 54 narrows, and the coil spring 55 is compressed. Thus, the coil spring 55 applies the biasing force to the spool 12 through the second spring receiving member 54 and the driven body 52 in such a direction that the spool 12 returns to the first side in the axial direction, i.e., to the neutral position. With this, when the electric actuator 13C fails, the spool 12 is made to return to the neutral position by the coil spring 55.

When the spool 12 is moved from the neutral position to the first side in the axial direction by the electric actuator 13C, the first spring receiving member 53 is pushed by the second axial end portion 12e of the spool 12 toward the first side in the axial direction. On the other hand, since the outer peripheral edge of the second spring receiving member 54 contacts the step portion 51a, the second spring receiving member 54 cannot move and is maintained at the same position. With this, the space between the two spring receiving members 53 and 54 narrows, and the coil spring 55 is compressed. Thus, the coil spring 55 applies the biasing force to the spool 12 through the first spring receiving member 53 in such a direction that the spool 12 returns to the second side in the axial direction, i.e., to the neutral position. With this, when the electric actuator 13C fails, the spool 12 is made to return to the neutral position by the coil spring 55.

The spring mechanism 14C having such function includes the stopper member 56 as described above. The stopper member 56 restricts the compression of the coil spring 55 such that the amount of compression of the coil spring 55 does not exceed a predetermined distance. To be specific, the stopper member 56 is formed in a substantially cylindrical shape. The stopper member 56 is arranged inside the coil spring 55 and externally attached to the driven body 52. Further, the stopper member 56 is arranged between the two spring receiving members 53 and 54. When the two spring receiving members 53 and 54 are relatively displaced and approach relative to each other, the stopper member 56 arranged as above is interposed therebetween to restrict the movement of the spool 12 to the first side or second side in the axial direction by a predetermined amount or more.

In the spool valve device 1C configured as above, the spool 12 can be moved to the first side or second side in the axial direction in accordance with the rotational direction of the rotor of the motor 22 as described above, and the position of the spool 12 can be adjusted by controlling the angular position of the rotor. To be specific, the position of the spool 12 can be controlled by the electric motor 22 with a higher degree of accuracy, and opening degree control of the spool valve device 1C can be performed with a higher degree of accuracy. In the spool valve device 1C, as with the spool valve device 1 of Embodiment 1, the operation abnormality of the spool valve 6C can be determined by the drive controller 7.

Other than the above, the spool valve device 1C of Embodiment 4 has the same operational advantages as the spool valve device 1 of Embodiment 1.

Embodiment 5

The spool valve device 1D of Embodiment 5 is similar in configuration to the spool valve device 1C of Embodiment 4. Therefore, components of the spool valve device 1D of Embodiment 5 which are different from the components of the spool valve device 1C of Embodiment 4 will be mainly described. The same reference signs are used for the same components, and a repetition of the same explanation is avoided.

Figure 5:
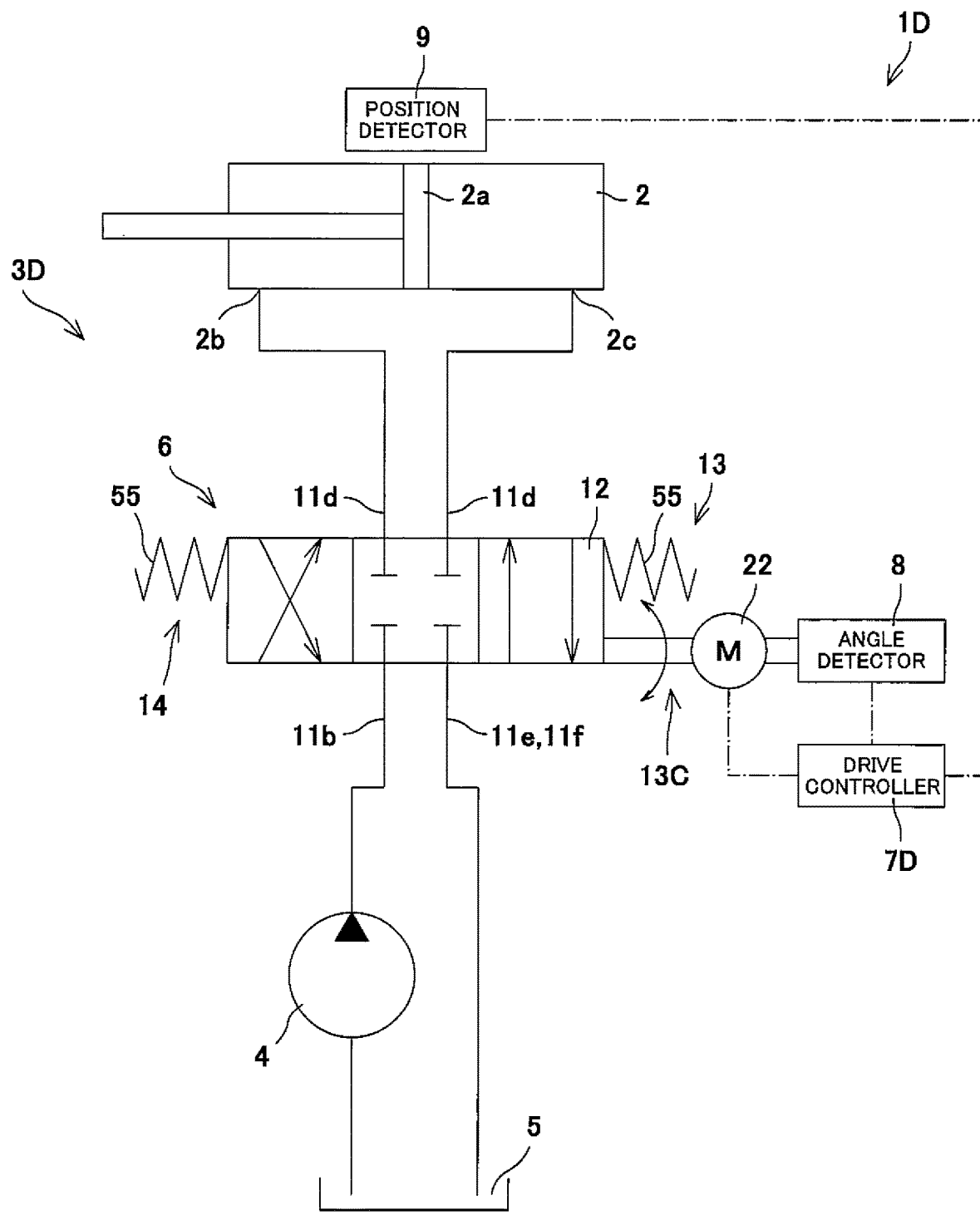
FIG. 5 is a hydraulic circuit diagram showing a hydraulic pressure supply apparatus including a spool valve device according to Embodiment 5.

As shown in FIG. 5, the spool valve device 1D of Embodiment 5 includes the spool valve 6, a drive controller 7D, the angle detector 8, and a drive amount detector 9. As with the drive controller 7 of Embodiment 1, the drive controller 7D supplies electric power to the electric motor 22 to control the operation of the electric motor 22 and determines the presence or absence of the operation abnormality of the spool 12. Further, the drive controller 7D performs the abnormality determination based on a detection result of the angle detector 8 and a detection result of the drive amount detector 9. The drive amount detector 9 is provided at the hydraulic cylinder 2 and detects a drive amount of the rod 2a (i.e., the position of the rod 2a) of the hydraulic cylinder 2.

In order to perform the abnormality determination, the drive controller 7D stores the following functions. To be specific, the position of the spool 12 when moving the rod 2a to a predetermined position is shown, i.e., the angular position of the rotor is shown, and the function is created as below. To be specific, first, a hydraulic pressure supply apparatus 3D including the drive controller 7D is assembled, and the hydraulic pressure supply apparatus 3D is connected to the hydraulic cylinder 2. Then, in the hydraulic pressure supply apparatus 3D, the drive current is supplied to the electric motor 22 to rotate the rotor, and this moves the spool 12. At this time, the angular position of the rotor is changed by increasing or decreasing the drive current supplied to the electric motor 22, and the drive amounts of the rod 2a are detected at the respective angular positions by the drive amount detector 9. With this, a relation between the angular positions of the rotor and the drive amounts of the rod 2a is found out, and a reference drive amount that is the drive amount of the rod 2a to be driven with respect to the detected angular position of the rotor is represented by a function. Then, the drive controller 7D calculates the reference drive amount based on the function and the detected angular position of the rotor during the actual operation. Further, the drive controller 7D compares the calculated reference drive amount with an actual drive amount that is the drive amount of the rod 2a detected by the drive amount detector 9 and calculates a difference therebetween. When this difference falls within a predetermined range, the drive controller 7 determines that the spool valve 6 is normally operating. On the other hand, when the difference is large, the drive controller 7 determines that the spool 12 cannot move, or the operation abnormality (such as the disconnection between the drive controller 7 and the electric motor 22) has occurred at the spool valve 6.

As above, in the spool valve device 1D, the operation abnormality of the spool valve 6 is determined based on the drive amount of the rod 2a of the hydraulic cylinder 2, and whether or not the rod 2a of the hydraulic cylinder 2 that is a control target is performing desired movement can also be determined.

Other than the above, the spool valve device 1D of Embodiment 5 has the same operational advantages as the spool valve device 1C of Embodiment 4.

Other Embodiments

Figure 6:
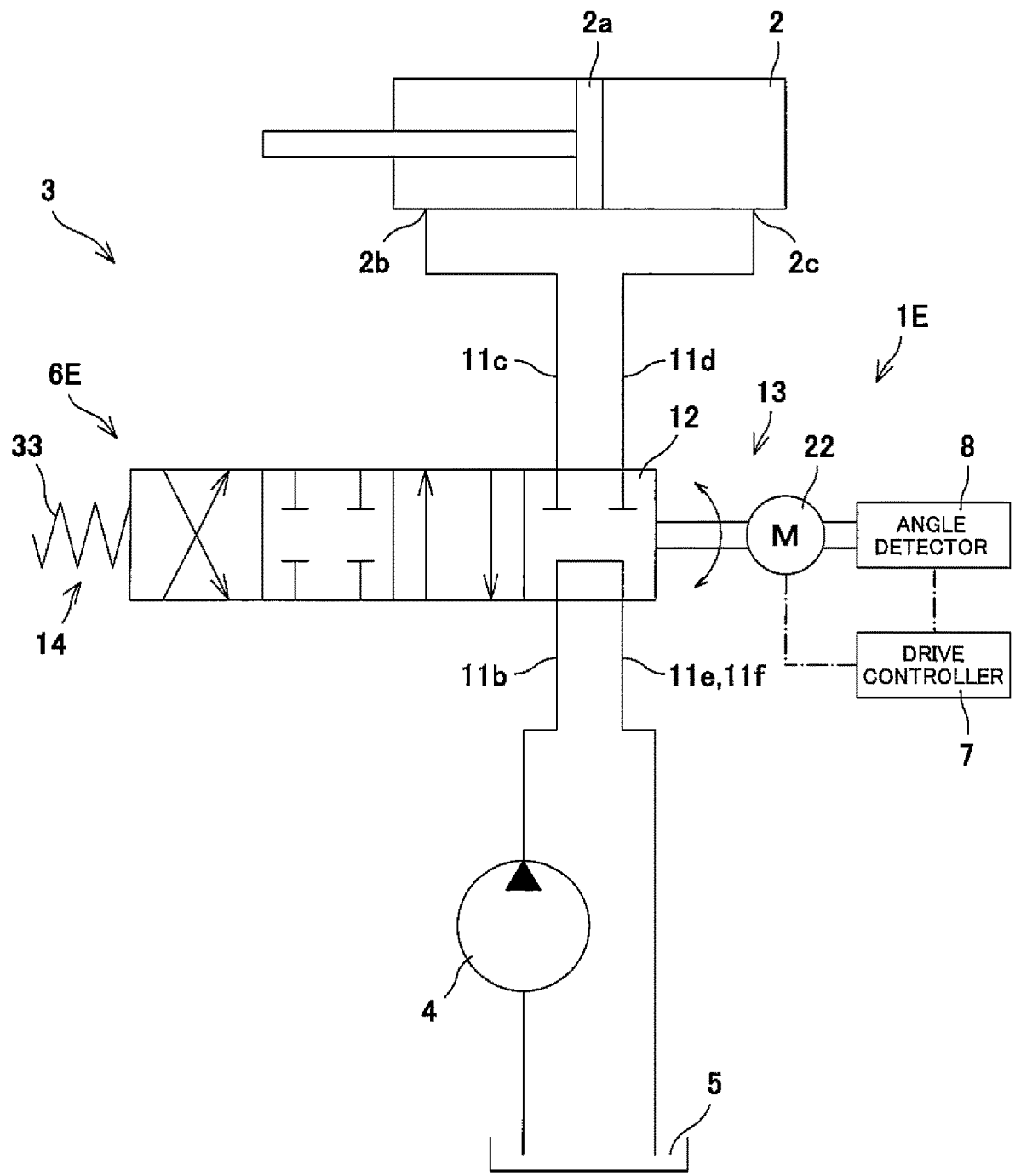
FIG. 6 is a hydraulic circuit diagram showing a hydraulic pressure supply apparatus including a spool valve device according to another embodiment.

Each of the spool valve devices 1 and 1A to 1D of Embodiments 1 to 5 is connected to the hydraulic cylinder 2. However, an actuator to which each of the spool valve devices 1 and 1A to 1D of Embodiments 1 to 5 is connected is not limited to the hydraulic cylinder 2. For example, the actuator to which each of the spool valve devices 1 and 1A to 1D of Embodiments 1 to 5 is connected may be a hydraulic motor and is only required to be a hydraulic actuator configured to operate by being supplied with an operating liquid. Further, in each of the spool valve devices 1 and 1A to 1C of Embodiments 1 to 4, a three-position spool valve is adopted as the spool valve 6, but the spool valve 6 is not limited to this. For example, a four-position spool valve, such as a spool valve 6E of the spool valve device 1E shown in FIG. 6, may be used. In the spool valve 6E, when the thrust of the electric actuator 13 becomes zero, the coil spring 33 moves the spool 12 to a fail safe position that is a most offset position in a direction in which the coil spring 33 biases the spool 12. At the fail safe position, the pump passage 11b and the tank passages 11e and 11f communicate with each other, and the rod-side passage 11c and the bottom-side passage 11d are blocked. As above, the spool valve 6E is configured such that the spool 12 can move to the fail safe position. With this, when the current supplied to the electric motor 22 is stopped at the time of, for example, the occurrence of the abnormality, the flow of the operating liquid to the hydraulic cylinder 2 can be stopped, and this can stop the hydraulic cylinder 2.

The ball joint is adopted as the coupling member 40, but the coupling member 40 is not limited to the ball joint. For example, a universal joint may be adopted as the coupling member 40. In each of the spool valve devices 1 and 1A to 1D of Embodiments 1 to 5, the ball screw mechanism is adopted as the linear-motion conversion mechanism 23. Instead, a sliding screw mechanism, a trapezoidal screw mechanism, or the like may be adopted.

In the spool valve devices 1, 1A, 1B, and 1D of Embodiments 1, 2, 3, and 5, the operation abnormality of the spool 12 is determined by different abnormality determination methods. However, these abnormality determination methods may be combined. To be specific, in the spool valve device 1D of Embodiment 5, the abnormality determination method executed in the spool valve device 1 of Embodiment 1 may be performed in addition to the abnormality determination method executed in the spool valve device 1D of Embodiment 5. Further, in the spool valve device 1D of Embodiment 5, the abnormality determination method executed in the spool valve device 1A of Embodiment 2 may be performed in addition to the abnormality determination method executed in the spool valve device 1D of Embodiment 5. By performing two abnormality determination methods as above, the presence or absence of the operation abnormality of the spool 12 can be determined further accurately.

In each of the spool valve devices 1 and 1A to 1D of Embodiments 1 to 5, the electric motor 22 equipped with the angle detector constituted by the resolver or the encoder is adopted. However, each of Embodiments 1 to 5 does not necessarily have to adopt such electric motor, and a sensorless electric motor may be adopted. When the sensorless electric motor is adopted, the drive controller 7 also serves as the angle detector, and the operation abnormality of the spool 12 can be determined by using the angular position detected by the drive controller 7.

REFERENCE SIGNS LIST 1, 1A-1D spool valve device
2 hydraulic cylinder (hydraulic actuator)
6, 6C, 6E spool valve
7, 7D drive controller
8 angle detector
9 drive amount detector
11 housing
11b pump passage (channel)
11c rod-side passage
11d bottom-side passage
11e, 11f tank passage
12 spool
13, 13C electric actuator
14, 14C spring mechanism
22 electric motor
23, 23C linear-motion conversion mechanism
25 piston (pressing member)
25a tip end portion
33 coil spring (biasing member)

The invention claimed is:
1. A spool valve device comprising:
a housing on which a plurality of channels are formed;
a spool inserted into the housing so as to be movable, the spool being configured to move and change a position of the spool to change connection statuses of the plurality of channels;
an electric actuator including an electric motor and a linear-motion conversion mechanism, the electric motor being configured to rotate an output shaft by torque corresponding to a drive current supplied to the electric motor, the linear-motion conversion mechanism being configured to convert rotational movement of the output shaft into straight movement and apply thrust corresponding to the torque to the spool to change the position of the spool;
a biasing member configured to apply biasing force to the spool against the thrust of the electric actuator;
an angle detector configured to detect an angular position of the output shaft of the electric motor;
a driving portion configured to drive the electric motor by controlling flow of the drive current supplied to the electric motor based on a position command input to the driving portion and the angular position detected by the angle detector; and
an abnormality determining portion configured to calculate the position of the spool based on the angular position detected by the angle detector and determine presence or absence of operation abnormality of the spool based on the drive current supplied from the driving portion to the electric motor in addition to the angular position detected by the angle detector, wherein:
the abnormality determining portion is configured to acquire first drive currents to be supplied to the electric motor to move the spool to respective positions;
the abnormality determining portion calculates the position of the spool based on the angular position detected by the angle detector and acquires the first drive current to be supplied to the electric motor to move the spool to the calculated position;
the abnormality determining portion determines the presence or absence of the operation abnormality of the spool based on a difference between the acquired first drive current and an actual drive current that is the drive current actually supplied from the driving portion to the electric motor;
the abnormality determining portion is configured to acquire second drive currents to be supplied to the electric motor to make the spool accelerate at respective arbitrary acceleration speeds;
the abnormality determining portion acquires the second drive current to be supplied to the electric motor to move the spool at the acceleration speed calculated based on the input position command; and
the abnormality determining portion determines the presence or absence of the operation abnormality of the spool based on a difference between the actual drive current and a value obtained by adding the acquired second drive current to the acquired first drive current.

2. The spool valve device according to claim 1, wherein:
the abnormality determining portion calculates the position of the spool based on the angular position detected by the angle detector;
the abnormality determining portion calculates a deviation amount between the calculated position of the spool and the input position command; and
the abnormality determining portion determines the presence or absence of the operation abnormality of the spool based on whether or not the calculated deviation amount is a predetermined threshold or less.

3. The spool valve device according to claim 1, wherein:
the linear-motion conversion mechanism includes a pressing member configured to perform the straight movement and converts the rotational movement of the output shaft into the straight movement of the pressing member; and
the pressing member contacts the spool and pushes the spool against the biasing member to move the spool.

4. A spool valve device comprising:
a housing on which a plurality of channels are formed;
a spool inserted into the housing so as to be movable, the spool being configured to move and change a position of the spool to change connection statuses of the plurality of channels;
an electric actuator including an electric motor and a linear-motion conversion mechanism, the electric motor being configured to rotate an output shaft by torque corresponding to a drive current supplied to the electric motor, the linear-motion conversion mechanism being configured to convert rotational movement of the output shaft into straight movement and apply thrust corresponding to the torque to the spool to change the position of the spool;
a biasing member configured to apply biasing force to the spool against the thrust of the electric actuator;
an angle detector configured to detect an angular position of the output shaft of the electric motor;
a driving portion configured to drive the electric motor by controlling flow of the drive current supplied to the electric motor based on a position command input to the driving portion and the angular position detected by the angle detector;
an abnormality determining portion configured to calculate the position of the spool based on the angular position detected by the angle detector and determine presence or absence of operation abnormality of the spool; and a drive amount detector configured to detect a drive amount of a hydraulic actuator, the hydraulic actuator being connected to at least one of the plurality of channels and operated by an operating liquid supplied through the at least one channel, wherein the abnormality determining portion determines the presence or absence of the operation abnormality of the spool based on the drive amount detected by the drive amount detector in addition to the angular position detected by the angle detector.

5. The spool valve device according to claim 4, wherein:

the abnormality determining portion is configured to acquire the angular positions of the output shaft of the electric motor with respect to the respective drive amounts of the hydraulic actuator;

the abnormality determining portion acquires, from a correspondence relation between the drive amounts and the angular positions, the drive amount of the hydraulic actuator based on the angular position detected by the angle detector; and the abnormality determining portion determines the presence or absence of the operation abnormality of the spool based on a difference between the acquired drive amount and an actual drive amount detected by the drive amount detector.

* * * * *